United States Patent
Arai et al.

[11] Patent Number: 6,018,630
[45] Date of Patent: Jan. 25, 2000

[54] CAMERA VIEWFINDER HAVING A VIEWPOINT DETECTING APPARATUS

[75] Inventors: Takashi Arai, Machida; Hirofumi Nakano, Yokohama, both of Japan

[73] Assignee: Canon Kabushiki Kaisha, Japan

[21] Appl. No.: 08/441,697

[22] Filed: May 15, 1995

[30] Foreign Application Priority Data

May 17, 1994 [JP] Japan ................................. 6-125884
Jun. 17, 1994 [JP] Japan ................................. 6-159393

[51] Int. Cl.[7] ................................................ G03B 17/00

[52] U.S. Cl. ................................................ 396/51

[58] Field of Search ............................... 396/51

[56] References Cited

U.S. PATENT DOCUMENTS 5,557,364  9/1996  Shindo et al. ........................ 396/55
5,606,390  2/1997  Arai et al. ........................... 396/51

FOREIGN PATENT DOCUMENTS 1241511  9/1989  Japan ........................... G02B 7/11
 232312  2/1990  Japan ........................... G02B 7/28

Primary Examiner—W. B. Perkey
Attorney, Agent, or Firm—Fitzpatrick, Cella, Harper & Scinto

[57] ABSTRACT

A finder apparatus in which a viewpoint detecting apparatus is built in a finder unit and a light emitting device and a photosensing device constructing the viewpoint detecting apparatus are arranged in a space which is formed by notching a part of an eyepiece.

9 Claims, 7 Drawing Sheets

CAMERA VIEWFINDER HAVING A VIEWPOINT DETECTING APPARATUS

BACKGROUND OF THE INVENTION

1. Field of the Invention

The invention relates to an image monitor apparatus such as a finder or the like which is used in a still camera, video camera, or the like.

2. Related Background Art

In recent years, in a still camera, video camera, or the like, there has been proposed a viewpoint detecting apparatus for detecting a viewpoint in a finder picture plane of an operator, for setting a range finder frame and a photometric frame to the viewpoint, and for observing an index mark which has previously been displayed in the picture plane, thereby executing a function which was made to correspond to the index mark.

FIG. 1 shows a schematic construction of an example of a finder of a video camera having a viewpoint detecting apparatus.

In the diagram, a viewpoint detection optical system 107 is provided in a rear portion of a finder 111 of a video camera VC having a finder picture plane 112. Namely, the viewpoint detection optical system 107 has a dichroic mirror 103 for transmitting a visible light and reflecting infrared rays and an eyepiece 102 which are arranged on the same axis as a 101 for irradiating an eye E of a photographer who looks in the finder in close vicinity to the eyepiece 102. The optical system 107 further has an image forming lens 104, a photoelectric converting device 105, and a viewpoint detection unit 106 which are arranged on a reflection optical axis of the dichroic mirror 103.

The finder picture plane 112 has a rectangular shape which is laterally long as shown in a front view of the viewpoint detection optical system 107 in FIG. 2B.

The photographer observes the finder picture plane 112 through the eyepiece 102 and dichroic mirror 103. An image of the eye E of the photographer irradiated by the infrared rays emitting diode 101 is reflected just beside the finder, namely, to the short side of the finder picture plane by the dichroic mirror 103 as shown in a plane view of FIG. 2A. The reflected image passes through an optical path shown by an alternate long and short dash line and is formed on the photoelectric converting device 105 by the image forming lens 104. The viewpoint detection unit 106 detects a viewpoint of the photographer on the basis of the image of the eye which was picked up by the photoelectric converting device 105. Viewpoint information is inputted to a system control unit 109. The system control unit 109 controls a lens image pickup system 108 and makes a display circuit 110 operative.

With respect to the detection of the viewpoint, the position of the center of a pupil and the position of a reflected image (cornea reflection image) of a cornea surface of the infrared rays emitting diode 101 are obtained from the image of the eye E picked up by the photoelectric converting device 105, thereby obtaining a rotational angle of the eyeball from the relation between those two positions. Coordinates on the finder picture plane are calculated by multiplying a predetermined constant to the rotational angle of the eyeball obtained.

A processing flow for detecting the viewpoint has been described in detail in JP-A-1-241511, JP-A-2-32312, and the like.

The foregoing example has the following drawbacks in case of an arrangement of the optical system in which the optical path to the photoelectric converting device is bent in the short side direction of the finder.

Since the dichroic mirror 103 has a role to reflect the image of the eye in the direction of the photoelectric converting device 105, such a role can be accomplished so long as it has a length between points (a) and (b) shown in FIG. 2A.

However, as for the optical path from the finder picture plane 112, since the optical path of the finder is located in the outside of the points (a) and (b) as shown by an alternate long and short dash line, if the plate-shaped dichroic mirror 103 has a length between the points (a) and (b), when the photographer looks in the finder, an edge of the dichroic mirror 103 is seen like a vertical line. To avoid such a phenomenon, the dichroic mirror 103 has to be set to a long length up to the outside of the optical path in the long side direction of the finder as shown in FIGS. 2A and 2B, so that there is a problem such that the viewpoint detection optical system cannot be miniaturized.

SUMMARY OF THE INVENTION

The present invention is made to solve the above problems and it is the first object of the invention to provide a finder apparatus of a camera in which a viewpoint detection optical system can be miniaturized.

To accomplish the above object, according to a preferred embodiment of the invention, there is disclosed a finder apparatus of a video camera or the like, which has a viewpoint detecting apparatus therein, characterized by that a photoelectric converting device for receiving an image of the eye of a photographer irradiated by a light emitting device is arranged on the long side direction side of a finder and a dichroic mirror is arranged in a finder optical path so as to bend an optical path in the long side direction.

According to the finder of the video camera having the viewpoint detecting apparatus, therefore, the dichroic mirror to bend the optical path can be miniaturized, distances between the dichroic mirror and the image forming lens and photoelectric converting device can be reduced, and the viewpoint detection optical system can be miniaturized.

The second object of the invention is to provide an image monitor apparatus in which a viewpoint detection unit is built.

The third object of the invention is to provide an image monitor apparatus which can eliminate an occurrence of a vain space which cannot be used and can miniaturize the apparatus.

To accomplish the above object, according to a preferred embodiment of the invention, there is disclosed an image monitor apparatus for observing an image, comprising: display means for displaying the image; an eyepiece for forming a light image corresponding to the image displayed to the display means onto the eye of an observer; detecting means for detecting predetermined information from light information indicative of a motion of the eye of the observer; and light separating means for leading the light image corresponding to the image displayed on the display means to the eyepiece, for separating the light information indicative of a motion of the eye of the observer from the light image and leading from the eyepiece to the detecting means, wherein the detecting means is arranged at a position near the eyepiece edge portion.

The fourth object of the invention is to provide a finder unit having a viewpoint detecting apparatus built.

To accomplish the above objects, according to a preferred embodiment of the invention, there is disclosed a small finder unit of a viewpoint detecting apparatus built-in type in which a lower portion of an eyepiece in an electronic viewfinder is notched and at least a part of a sensor for detecting a line of sight, illuminating means, and the like is arranged in a space formed by such a notched lower portion, so that a high space use efficiency is obtained.

According to another preferred embodiment of the invention, an optical system which is optimum as a finder unit in which a viewpoint detecting apparatus is built is disclosed.

The above and other objects and features of the present invention will become apparent from the following detailed description and the appended claims with reference to the accompanying drawings.

BRIEF DESCRIPTION OF THE DRAWINGS

FIGS. 2A and 2B are constructional diagrams of a viewpoint detection optical system in FIG. 1, in which FIG. 2A is a plan view and FIG. 2B is a front view;

FIGS. 3A and 3B are constructional diagrams of a viewpoint detection optical system in a video camera having a viewpoint detecting apparatus according to the first embodiment of the invention, in which FIG. 3A is a side elevational view and FIG. 3B is a front view;

DETAILED DESCRIPTION OF THE PREFERRED EMBODIMENTS

The first embodiment of the invention will be described hereinbelow with reference to FIGS. 3A and 3B.

Figure 1:
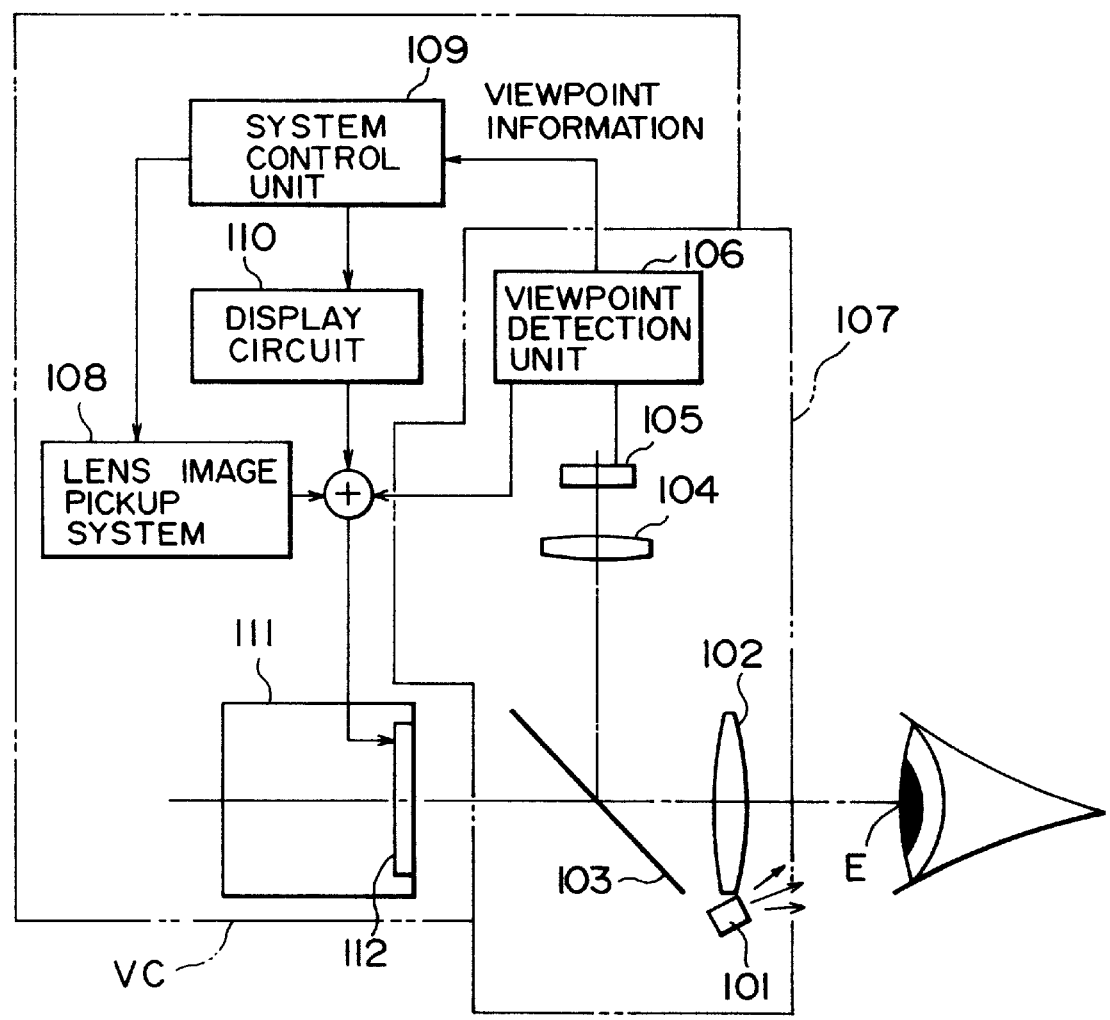
FIG. 1 is a constructional diagram of viewpoint detecting means.
Figure 2A:
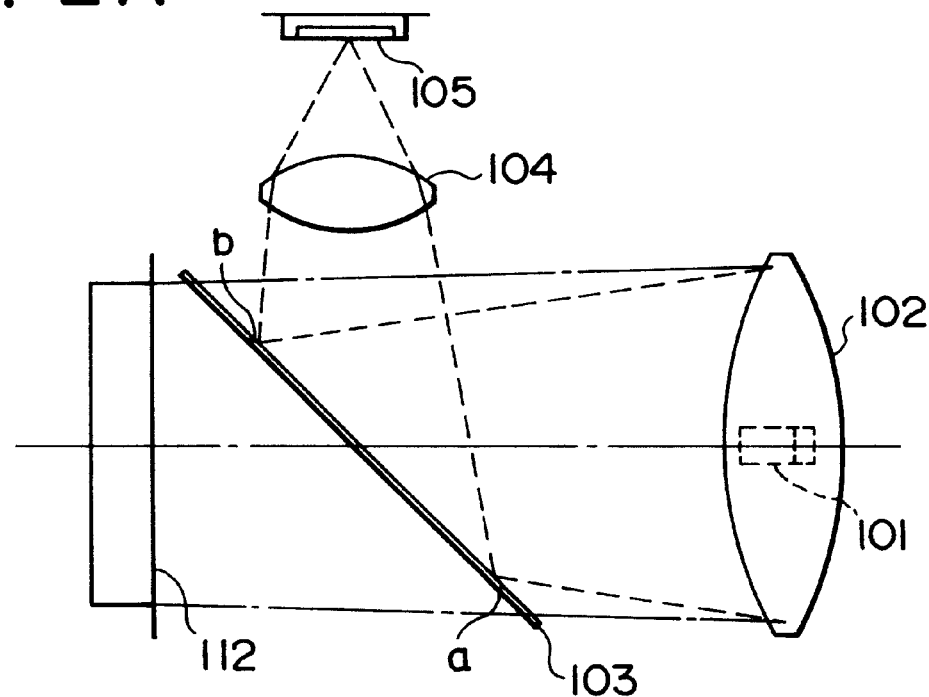
Figure 2B:
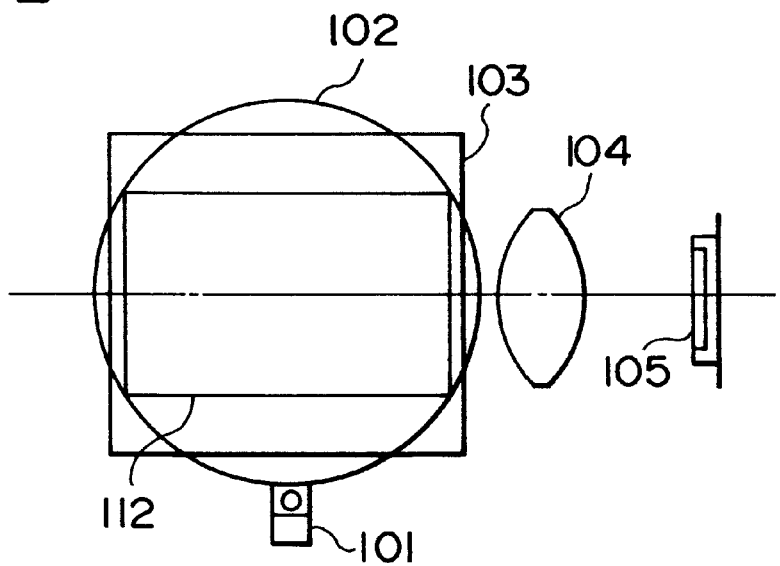
Figure 3A:
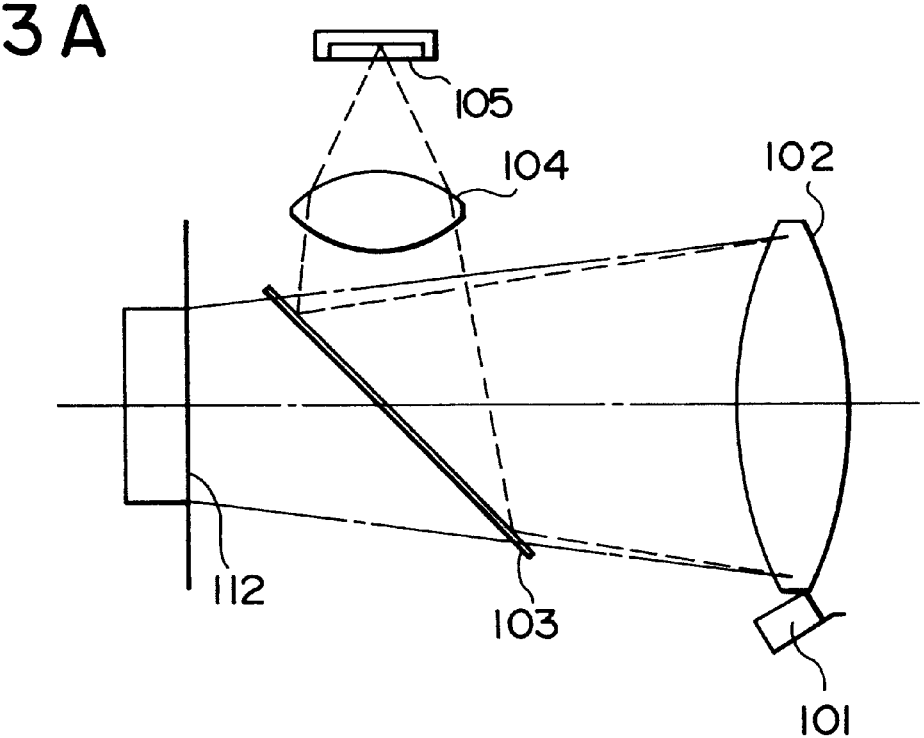
Figure 3B:
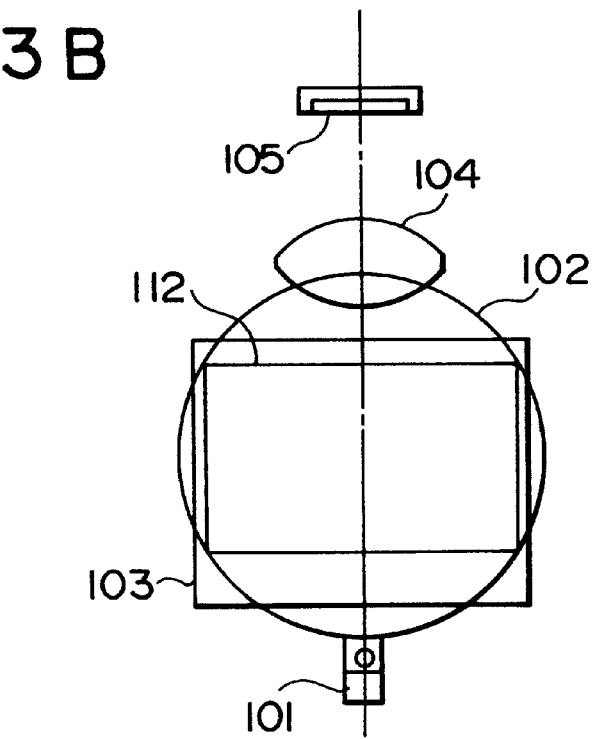

FIGS. 3A and 3B are constructional diagrams of a viewpoint detection optical system. FIG. 3A is a side elevational view. FIG. 3B is a front view. The same component elements as those shown in the conventional apparatus are designated by the same reference numerals and will be described.

In the embodiment, the 2-dimensional photoelectric converting device 105 is arranged on the long side direction side of the finder picture plane 112 having a rectangular shape which is long in the lateral direction. The plate-shaped dichroic mirror 103 is attached to a frame (not shown) so that its reflecting surface bends the optical path to the long side direction side for a finder optical axis. An image of the edge of a photographer irradiated by the infrared rays emitting diode 101 is reflected by the dichroic mirror 103 and is formed onto the photoelectric converting device 105 by the image forming lens 104. The other construction is similar to that in the foregoing apparatus.

In the embodiment with the above construction, the photographer can observe the finder picture plane 112 through the eyepiece 102 and dichroic mirror 103.

The image of the eye of the photographer irradiated by the infrared rays emitting diode 101 is converged by the eyepiece 102 and is reflected upward by the dichroic mirror 103, namely, in the direction of the long side of the finder picture plane 112. After that, the reflected image is further converged by the image forming lens 104 and formed onto the photoelectric converting device 105. Viewpoint detection unit (not shown) detects a line of sight of the photographer on the basis of the image of the eye of the photographer formed on the photoelectric converting device 105. A detection signal of the viewpoint detection unit is inputted to a system control unit (not shown). The system control unit executes various kinds of controls of the video camera.

According to the embodiment, as described above, the photoelectric converting device for forming the image of the eye of the photographer irradiated by the light emitting device is arranged on the long side direction side of the finder. The dichroic mirror is arranged in the finder optical path so as to bend the optical path in such a long side direction. Thus, the dichroic mirror can be miniaturized and the distance between the dichroic mirror and the photoelectric converting device can be reduced. Therefore, there is an effect such that the viewpoint detection optical system can be miniaturized.

The second embodiment of the invention will now be described. A viewpoint detecting method will be first described.

Figures 4A, 4B:
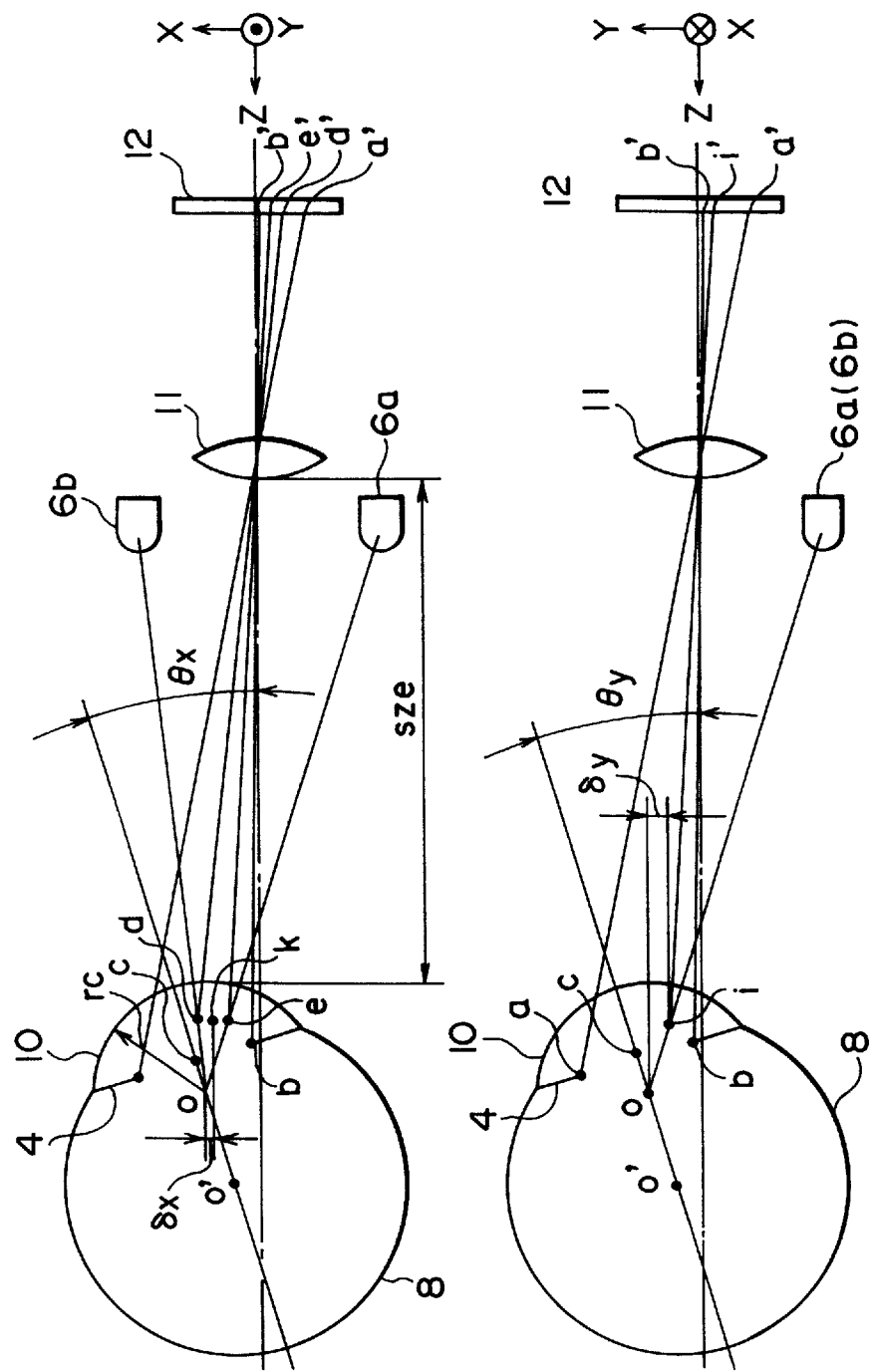
FIGS. 4A and 4B are diagrams for explaining a principle of a viewpoint detecting method in the invention.

In the viewpoint detecting method, as shown in FIGS. 4A and 4B, a pair of infrared rays emitting diodes (IRED) 6a and 6b for irradiating infrared rays toward the eye of the observer are used. As shown in FIGS. 4A and 4B, the infrared rays emitting diodes 6a and 6b are arranged almost symmetrically in an (x) direction (horizontal direction) with respect to the optical axis of an image forming lens 11 and are located at slightly lower side in a (y) direction (vertical direction) of the image forming lens 11, thereby divergence irradiating the eyeball of the observer.

Figure 5A:
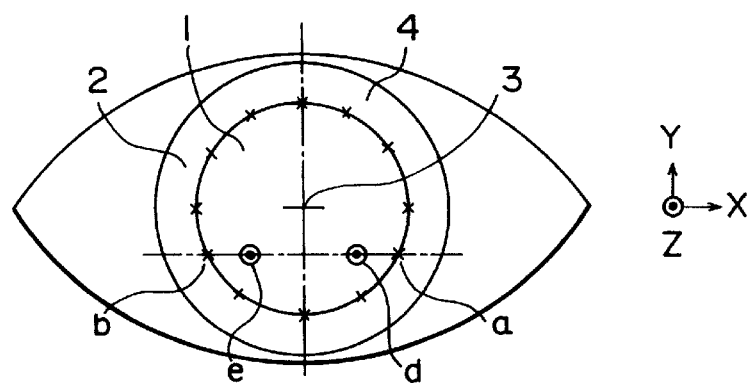
FIGS. 5A and 5B are diagrams for explaining a principle of the viewpoint detecting method.

A part of the irradiation light reflected by the eyeball is formed on an image sensor 12 by the image forming lens 11. As shown in FIG. 5A, an eyeball image which is formed on the image sensor comprises a pupil 1 having a center 3 and an iris 4 which is partitioned by an iris edge portion 2. Cornea reflection images (e) and (d) (virtual images) are formed in a line upper portion connecting cornea edge portions 2b and 2a in the lower portion of the pupil 1.

Figure 5B:
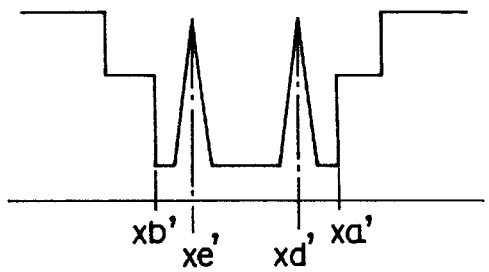

As shown in FIG. 5B, the image sensor 12 generates a high output at a position corresponding to each of the cornea reflection images (e) and (d) (virtual images).

When seeing a horizontal plane, as shown in FIG. 4A, the infrared rays emitted from the infrared rays emitting diode 6b are irradiated to a cornea 10 of an eyeball 8 of the observer and are reflected by the surface of the cornea 10. The cornea reflection image (d) (virtual image) formed by the reflected infrared rays is converged by the image forming lens 11 and is formed at a position d' on the image sensor 12.

Similarly, the infrared rays emitted from the infrared rays emitting diode 6a are irradiated to the cornea 10 of the eyeball 8 of the observer and are reflected by the surface of the cornea 10. The cornea reflection image (e) (virtual image) formed by the reflected infrared rays is converged by the image forming lens 11 and is formed at the position e' on the image sensor 12.

Light fluxes from edge portions (a) and (b) of the iris 4 pass through the image forming lens 11 and images of the edge portions (a) and (b) are formed at positions a' and b' on the image sensor 12.

When a rotational angle θ of the eyeball 8 for the optical axis of the image forming lens 11 is small, now assuming that (x) coordinates of the edge portions (a) and (b) of the iris 4 are set to xa and xb, xa and xb 12 ("x" marks shown in FIG. 5A).

Now, assuming that a center of a pupil obtained by a method of least squares of a circle is set to xc and an (x) coordinate of a center (o) of curvature of the cornea 10 is set to xo, a rotational angle θx for the optical axis of the eyeball 8 is calculated from the following equation (1).

$$oc^* \sin \theta x = xc - xo \tag{1}$$

When obtaining xo in consideration of a predetermined correction value δ at a middle point (k) between the cornea reflection images (d) and (e), xo is calculated by the following equation (2).

$$xk = (xd + xe)/2 \quad xo = (xd + xe)/2 + \delta x \tag{2}$$

where, δx denotes a numerical value which is geometrically obtained from an installing method of the apparatus, an eyeball distance, and the like and its calculating method is omitted.

Therefore, by substituting the equation (1) to the equation (2), θx is obtained. θx is expressed by the following equation (3).

$$\theta x = \arcsin[[xc - \{(xd + xe)/2 + \delta x\}]/oc] \tag{3}$$

Further, when coordinates of each of the characteristic points projected onto the image sensor 12 are rewritten to the following equation (4) by adding ['](dash), $$\theta x = \arcsin[[xc' - \{(xd' + xe')/2 + \delta x'\}]/oc/\beta] \tag{4}$$

where, β denotes a magnification which is determined by a distance sze of the eyeball to the image forming lens 11 and is actually obtained as a function of an interval |xd'−xe'| of the cornea reflection images.

When subsequently seeing a vertical plane, as shown in FIG. 4B, the cornea reflection images which are produced by the infrared rays emitting diodes 6a and 6b are generated at the same position and they are expressed by (i). Although a calculating method of a rotational angle θy of the eyeball is substantially the same as the calculating method of the rotational angle θx at the horizontal plane except that only the above equation (2) differs. Now, assuming that a (y) coordinate of the center of the curvature of the cornea is set to yo, the following equation (5) is obtained.

$$yo = yi + \delta y \tag{5}$$

where, δy denotes a numerical value which is geometrically obtained from an arranging method of the apparatus, a distance between the eyeballs, and the like and its calculating method is omitted here.

The rotational angle θy in the vertical direction, therefore, is obtained from the following equation (6).

$$\theta y = \arcsin[\{yc' - (yi' + \delta y')\}/oc/\beta] \tag{6}$$

Further, by using a constant (m) which is determined by the finder optical system, position coordinates (xn, yn) on the picture plane of the finder of the video camera are respectively obtained on the horizontal plane and vertical plane from the following equations (7) and (8).

$$xn = m^* \arcsin[[xc' - \{(xd' + xe')/2 + \delta x'\}]/oc/\beta] \tag{7}$$

$$yn = m^* \arcsin[\{yc' - (yi' + \delta y')\}/oc/\beta] \tag{8}$$

As will be obvious from FIG. 5B, a leading edge (xb') and a trailing edge (xa') of an output waveform of the image sensor 12 are used to detect an edge of the pupil. Steep leading edge portions (xe', xd') are used to detect the coordinates of the cornea reflection images.

By applying the foregoing principle of the viewpoint detecting method to the finder of the still camera or video camera, by merely directing the line of sight to a target object, various kinds of functions such as an automatic focus adjusting function and the like can be executed.

Figure 6:
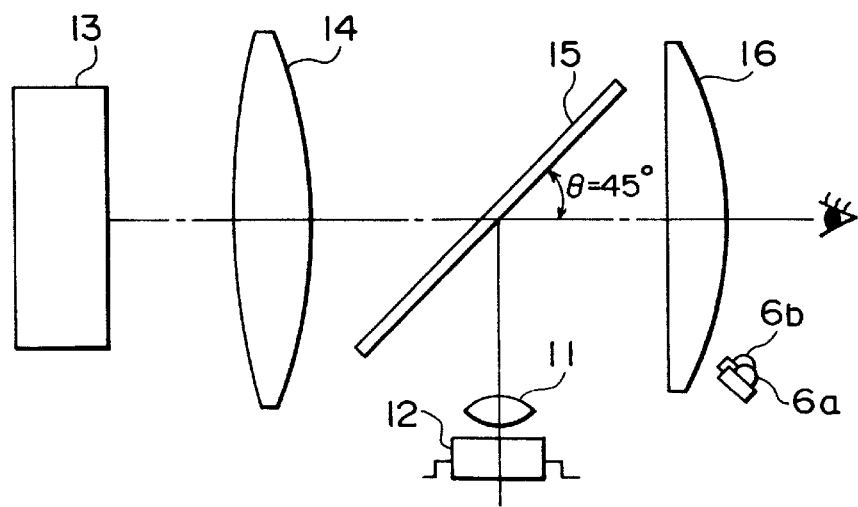
FIG. 6 is a diagram showing an optical system of a finder of a video camera using a viewpoint detecting apparatus.

A finder of the video camera using the above viewpoint detecting method will now be described with reference to the drawings. FIG. 6 is a diagram showing an example of an optical system of the finder of the video camera using the viewpoint detecting method.

As shown in FIG. 6, an image forming apparatus 13 for projecting an object image captured by an optical lens onto a picture plane is assembled in the finder of the video camera. The image forming apparatus 13 is constructed by a liquid crystal display apparatus. In the embodiment, although the liquid crystal display apparatus is used in the image forming apparatus 13, a CRT can be also used in place of it.

Eyepieces 14 and 16 are serially arranged in front of the picture plane of the image forming apparatus 13 so that their optical axes coincide. The eyepieces 14 and 16 are arranged with an interval. The eyepieces 14 and 16 cooperatively construct a lens for performing an enlargement of an image that is displayed on the picture plane of the image forming apparatus 13 by a predetermined magnification ratio, a reduction of each aberration, and a decrease in influence on a viewpoint detecting system, which will be explained hereinlater. The eyepiece 16 is a lens to lead the image formed thereon to the eye of the observer.

The pair of infrared rays emitting diodes 6a and 6b are arranged with an interval at positions near the lower portion of the eyepiece 16. Each of the infrared rays emitting diodes 6a and 6b emits infrared rays toward the eye which looks in the eyepiece 16 of the observer. The infrared rays emitted from each of the infrared rays emitting diodes 6a and 6b are irradiated to the cornea of the eyeball of the observer and are reflected by the surface of the cornea. Each of the cornea reflection images (virtual images) is formed by those reflected infrared rays.

A dichroic mirror 15 is arranged between the eyepieces 14 and 16 so as to be inclined at 45° for the optical axis of the image forming apparatus 13. A special coating such as to reflect only the infrared rays is coated on the surface of the dichroic mirror 15. The dichroic mirror 15 reflects each of the cornea reflection images (virtual images) from the observer.

The image forming lens 11 is arranged below the dichroic mirror 15. Each of the cornea reflection images reflected by the dichroic mirror 15 is converged by the image forming lens 11 and is formed on the image sensor 12. The image sensor 12 is constructed by a CCD (charge coupled device). The position on the picture plane of the image forming apparatus 13 to which the observer observes is detected from the cornea reflection image formed on the image sensor 12.

In this manner, the object to be captured by the observer can be discriminated. Various kinds of functions such as an automatic focus adjusting function and the like for the object discriminated can be executed. The above finder apparatus, however, still has a room for improvement with respect to a miniaturization.

Namely, in the above finder, since the dichroic mirror 15 is arranged so as to be inclined at 45° for the optical axis of the image forming apparatus 13, a large arrangement space is needed to arrange the dichroic mirror 15. The distance from the eyepiece 16 to the picture plane of the image forming apparatus 13 is long. Thus, a vain space which cannot be used occurs and a size of whole apparatus increases.

According to the above second embodiment, such a problem is solved and the apparatus can be further miniaturized. A degree of completion as a finder apparatus having the viewpoint detecting apparatus therein is high.

The second embodiment of the invention will now be described hereinbelow with reference to the drawings.

Figure 7:
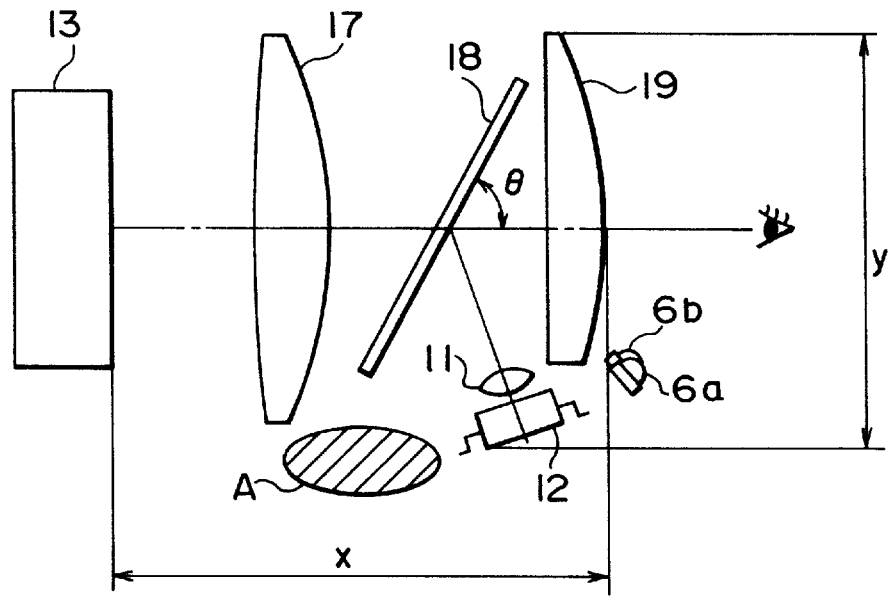
FIG. 7 is a side elevational view showing a construction of a main section of the second embodiment of the invention.

FIG. 7 is a side elevational view showing a construction of a main section of the second embodiment of an image monitor apparatus of the invention.

The image monitor apparatus of the embodiment is used as a finder of the video camera. As shown in FIG. 7, the image forming apparatus 13 for displaying an object image captured by an optical lens (not shown) onto the picture plane is assembled in the image monitor apparatus. The image forming apparatus 13 is constructed by a liquid crystal display apparatus.

Eyepieces 17 and 19 are serially arranged in front of the picture plane of the image forming apparatus 13 so that their optical axes coincide. The eyepieces 17 and 19 are arranged with an interval. The eyepieces 17 and 19 cooperatively construct a lens for performing an enlargement of the image which is displayed on the picture plane of the image forming apparatus 13 by a predetermined magnification ratio, a reduction of each aberration, and a decrease in influence on a viewpoint detecting system, which will be explained hereinlater. The eyepiece 19 is a lens to lead the image formed thereon to the eye of the observer. A notched portion is formed in the lower portion of the eyepiece 19. A degree of such a notch portion is decided in a manner such that the picture plane of the image forming apparatus 13 perfectly lies within a field of view of the observer and that no influence is exerted on the optical path to the image sensor 12, which will be explained hereinlater.

The pair of infrared rays emitting diodes 6a and 6b are arranged with an interval at positions near the lower portion of the eyepiece 19. Each of the infrared rays emitting diodes 6a and 6b emits infrared rays toward the eye of the observer who looks in the eyepiece 19. The infrared rays emitted from each of the infrared rays emitting diodes 6a and 6b are irradiated to the cornea of the eyeball of the observer and are reflected by the surface of the cornea. Each of the cornea reflection images (virtual images) is formed by each of the reflected infrared rays.

A dichroic mirror 18 is arranged between the eyepieces 17 and 19 so as to be inclined at an angle larger than 45° for the optical axis of the eyepiece 17. A special coating such as to reflect only the infrared rays is coated on the surface of the dichroic mirror 18. The dichroic mirror 18 reflects each of the cornea reflection images (virtual images) from the observer.

The image forming lens 11 is arranged at an oblique downward position in the vertical direction of the dichroic mirror 18. Each of the cornea reflection images reflected by the dichroic mirror 18 is converged by the image forming lens 11 and is formed on the image sensor 12. The image sensor 12 is constructed by a CCD (charge coupled device). The position on the picture plane of the image forming apparatus 13 to which the observer observes is detected from the cornea reflection image formed on the image sensor 12. Thus, the object to be captured by the observer is discriminated. Various kinds of functions such as an automatic focus adjusting function and the like for the object discriminated are executed.

Since the inclination angle θ of the dichroic mirror 18 to the optical axis of the eyepiece 17 is larger than 45°, a distance (x) from the eyepiece 19 to the picture plane of the image forming apparatus 13 is reduced. A dimension (y) in the vertical direction is reduced due to a movement of the image forming lens 11 toward the eyepiece 19 side. The apparatus can be miniaturized.

The space A which can be effectively used occurs between the eyepiece 17 and the image sensor 12 in a portion below the dichroic mirror 18 due to the movement of the image sensor 12 and image forming lens 11 toward the eyepiece 19 side. Other component parts can be assembled in the space A.

In the embodiment, although the dichroic mirror 18 has been used as light separating means, a half mirror can be also used in place of it.

Figure 8:
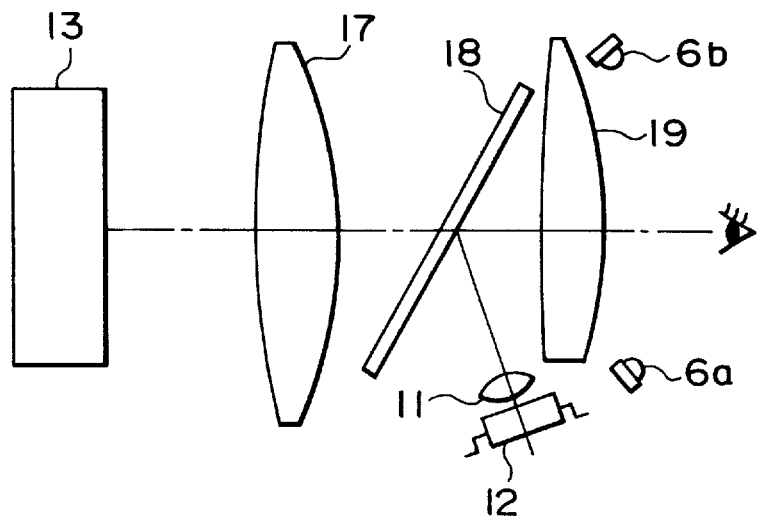
FIG. 8 is a top view showing a construction of a main section of the third embodiment of the invention.

The third embodiment of the invention will now be described with reference to the drawings. FIG. 8 is a top view showing a construction of a main section of the third embodiment of an image monitor apparatus of the invention.

The image monitor apparatus of the embodiment is used as a finder of a video camera. As shown in FIG. 8, the image forming apparatus 13 for displaying the object image captured by an optical lens (not shown) onto the picture plane is assembled in the image monitor apparatus.

The eyepieces 17 and 19 are serially arranged in front of the picture plane of the image forming apparatus 13 so that their optical axes coincide. The eyepieces 17 and 19 are arranged with an interval. The eyepieces 17 and 19 cooperatively construct a lens for performing an enlargement of an image which is displayed on the picture plane of the image forming apparatus 13 by a predetermined magnification ratio, a reduction of each aberration, and a decrease in influence on a viewpoint detecting system, which will be explained hereinlater. The eyepiece 19 is a lens to lead the image formed thereon to the eye of the observer. A notched portion is formed in a peripheral part (left edge portion in the diagram) of the eyepiece 19. A degree of such a notched portion is determined in a manner such that the picture plane of the image forming apparatus 13 perfectly lies within a field of view of the observer and that no influence is exerted on the optical path to the image sensor 12, which will be explained hereinlater.

The pair of infrared rays emitting diodes 6a and 6b are arranged at left and right positions near the eyepiece 19 with an interval. Each of the infrared rays emitting diodes 6a and 6b emits the infrared rays toward the eye of the observer who looks in the eyepiece 19. The infrared rays emitted from each of the infrared rays emitting diodes 6a and 6b are irradiated to the cornea of the eyeball of the observer and are reflected by the surface of the cornea. Each of the cornea reflection images (virtual images) is formed by each of the reflected infrared rays.

The dichroic mirror 18 is arranged between the eyepieces 17 and 19 so as to be inclined at an angle larger than 45° for the optical axis of the eyepiece 17. A special coating is coated on the surface of the dichroic mirror 18 so as to reflect only the infrared rays. The dichroic mirror 18 reflects each of the cornea reflection images (virtual images) from the observer.

The image forming lens 11 is arranged at an oblique front position (left oblique front position in the diagram) of the dichroic mirror 18. Each of the cornea reflection images reflected by the dichroic mirror 18 is converged by the image forming lens 11 and is formed on the image sensor 12.

As mentioned above, since the inclination angle θ of the dichroic mirror 18 for the optical axis of the eyepiece 17 is larger than 45°, the distance from the eyepiece 19 to the picture plane of the image forming apparatus 13 is short. By arranging the image sensor 12 and image forming lens 11 to the side of the eyepiece 19, a dimension in the lateral direction is reduced and the apparatus can be miniaturized. A vain space which cannot be used can be eliminated.

Figure 9:
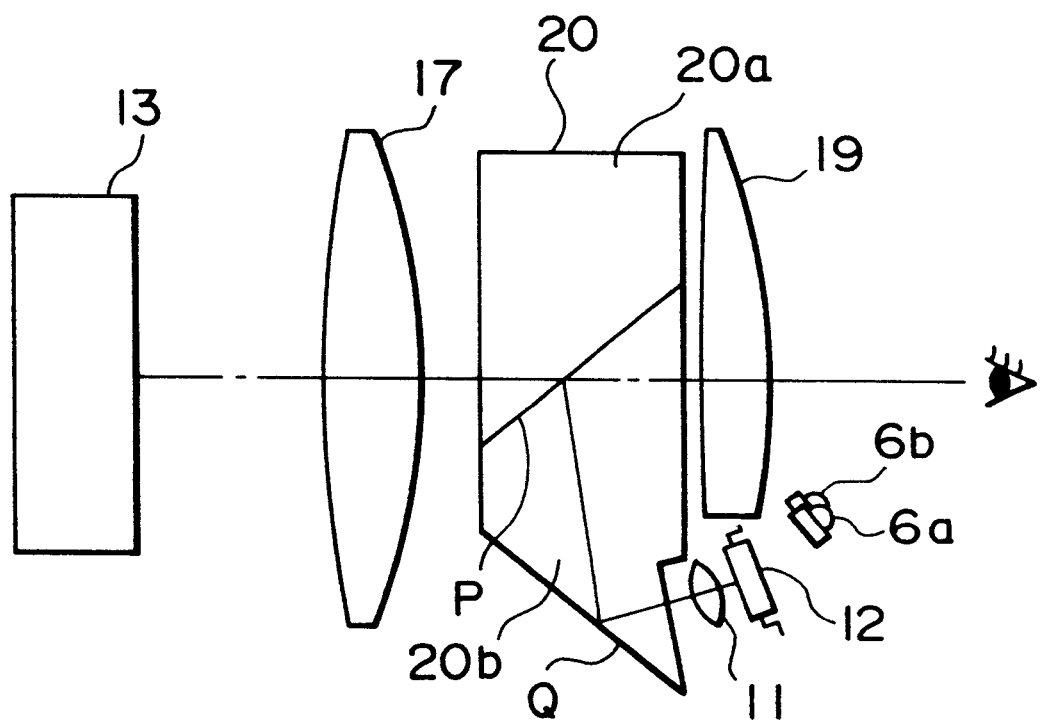
FIG. 9 is a side elevational view showing a construction of a main section of the fourth embodiment of the invention.

The fourth embodiment of the invention will now be described with reference to the drawings. FIG. 9 is a side elevational view showing a construction of a main section of the fourth embodiment of an image monitor apparatus of the invention.

The image monitor apparatus of the embodiment is used as a finder of a video camera. As shown in FIG. 9, the image forming apparatus 13 for displaying an object image captured by an optical lens (not shown) onto the picture plane is assembled in the image monitor apparatus.

The eyepieces 17 and 19 are serially arranged in front of the picture plane of the image forming apparatus 13 so that their optical axes coincide. The eyepieces 17 and 19 are arranged with an interval. The eyepieces 17 and 19 cooperatively construct a lens for performing an enlargement of the image which is displayed on the picture plane of the image forming apparatus 13 by a predetermined magnification ratio, a reduction of each aberration, and a decrease in influence on the viewpoint detecting system, which will be explained hereinlater. The eyepiece 19 is a lens to lead the image formed thereon to the eye of the observer. A notched portion is formed in the lower portion of the eyepiece 19. A degree of such a notched portion is determined in a manner such that the picture plane of the image forming apparatus 13 perfectly lies within the field of view of the observer and that no influence is exerted on the optical path to the image sensor 12, which will be explained hereinlater.

The pair of infrared rays emitting diodes 6a and 6b are arranged at positions near the lower portion of the image forming apparatus 13 with an interval. Each of the infrared rays emitting diodes 6a and 6b emits the infrared rays toward the eye of the observer who looks in the eyepiece 19. The Infrared rays emitted from each of the infrared rays emitting diodes 6a and 6b are irradiated to the cornea of the eyeball of the observer and are reflected by the surface of the cornea. Each of the cornea reflection images (virtual images) is formed by each of the reflected infrared rays.

A beam splitter 20 is arranged between the eyepieces 17 and 19. The beam splitter 20 is constructed by two prisms 20a and 20b which are joined. A special coating such as to reflect only the infrared rays is coated on a surface P of the prism 20a which faces the prism 20b. A surface Q which receives the infrared rays reflected by the surface P of the prism 20a is formed on the prism 20b. An angle of the surface Q is set to an angle so as to totally reflect the infrared rays entering the prism 20b. The beam splitter 20 leads the cornea reflection images (virtual images) from the observer to the image forming lens 11 through the surfaces P and Q.

The image forming lens 11 converges the reflected infrared rays from the surface Q. The converged infrared rays are formed on the image sensor 12. The image forming lens 11 and image sensor 12 are arranged below the eyepiece 19.

As mentioned above, since each of the cornea reflection images (virtual images) from the observer are led to the image forming lens 11 through the surfaces P and Q by the beam splitter 20, the distance from the eyepiece 19 to the picture plane of the image forming apparatus 13 is reduced. The dimension in the vertical direction is decreased by the movement of the image sensor 12 and image forming lens 11 toward the eyepiece 19 side. The apparatus can be miniaturized. A vain space which cannot be used can be eliminated.

Although the apparatus has been used as a finder of the video camera in each of the above embodiments, it can be also used as a finder of a still camera.

According to the image monitor apparatuses of the foregoing embodiments as described above, the apparatus comprises: the display means for displaying an image; the eyepiece to form the light image corresponding to the image displayed on the display means onto the eye of the observer; the detecting means for detecting predetermined information from the light information indicative of the motion of the eye of the observer; and the light separating means for leading the light image corresponding to the image displayed on the display means to the eyepiece, for separating the light information indicative of the motion of the eye of the observer from the light image, and for leading from the information indicative of the motion of the eye of the observer from the light image, and for leading from the eyepiece to the detecting means, wherein the detecting means is arranged at a position near the eyepiece edge portion. Therefore, an occurrence of a vain space which cannot be used can be eliminated. The apparatus can be miniaturized.

What is claimed is:

1. An image monitor apparatus comprising:

an eyepiece having a lens;

detecting means for detecting viewpoint information from light information reflected from an eye of an observer; and light guide means for guiding the light information indicative of a motion of the eye of said observer from said eyepiece to said detecting means, wherein said detecting means is arranged at a position adjacent to an edge portion of said lens of said eyepiece.

2. An apparatus according to claim 1, wherein said detecting means detects a position in a picture plane to which said observer observes on the basis of the light information indicative of the motion of said observer.

3. An apparatus according to claim 1, wherein said detecting means comprises:

a light source to irradiate a light beam in a specific wavelength region toward the eye of said observer; and photosensing means for receiving said light reflection information formed by the light beam from said light source.

4. An apparatus according to claim 3, wherein said photosensing means comprises a charge coupled device.

5. An apparatus according to claim 1, further having display means for displaying an image, and wherein an optical lens for leading a light image corresponding to said image to said light guide means is provided between said display means and said light guide means.

6. An apparatus according to claim 1, wherein said light guide means comprises a dichroic mirror.

7. An apparatus according to claim 1, wherein said light guide means comprises a dichroic mirror which is arranged obliquely in the vertical direction for an optical axis of said eyepiece at an angle larger than 45°.

8. An apparatus according to claim 1, wherein said light guide means comprises a beam splitter constructed by a plurality of prisms.

9. An apparatus according to claim 1, wherein the edge portion is formed with a space thereon by cutting off a portion of said eyepiece, and wherein said detecting means is arranged in the space of the edge portion.

* * * * *

UNITED STATES PATENT AND TRADEMARK OFFICE
CERTIFICATE OF CORRECTION

PATENT NO. : 6,018,630

DATED : January 25, 2000

INVENTOR(S) : TAKASHI ARAI, ET AL.

It is certified that error appears in the above-identified patent and that said Letters Patent is hereby corrected as shown below:

ON THE COVER PAGE
[56] FOREIGN PATENT DOCUMENTS
"1241511" should read --1-241511--; and
"232312" should read --2-32312--.

Signed and Sealed this

First Day of May, 2001

Attest:

NICHOLAS P. GODICI

Attesting Officer     Acting Director of the United States Patent and Trademark Office